United States Patent Office 3,708,408
Patented Jan. 2, 1973

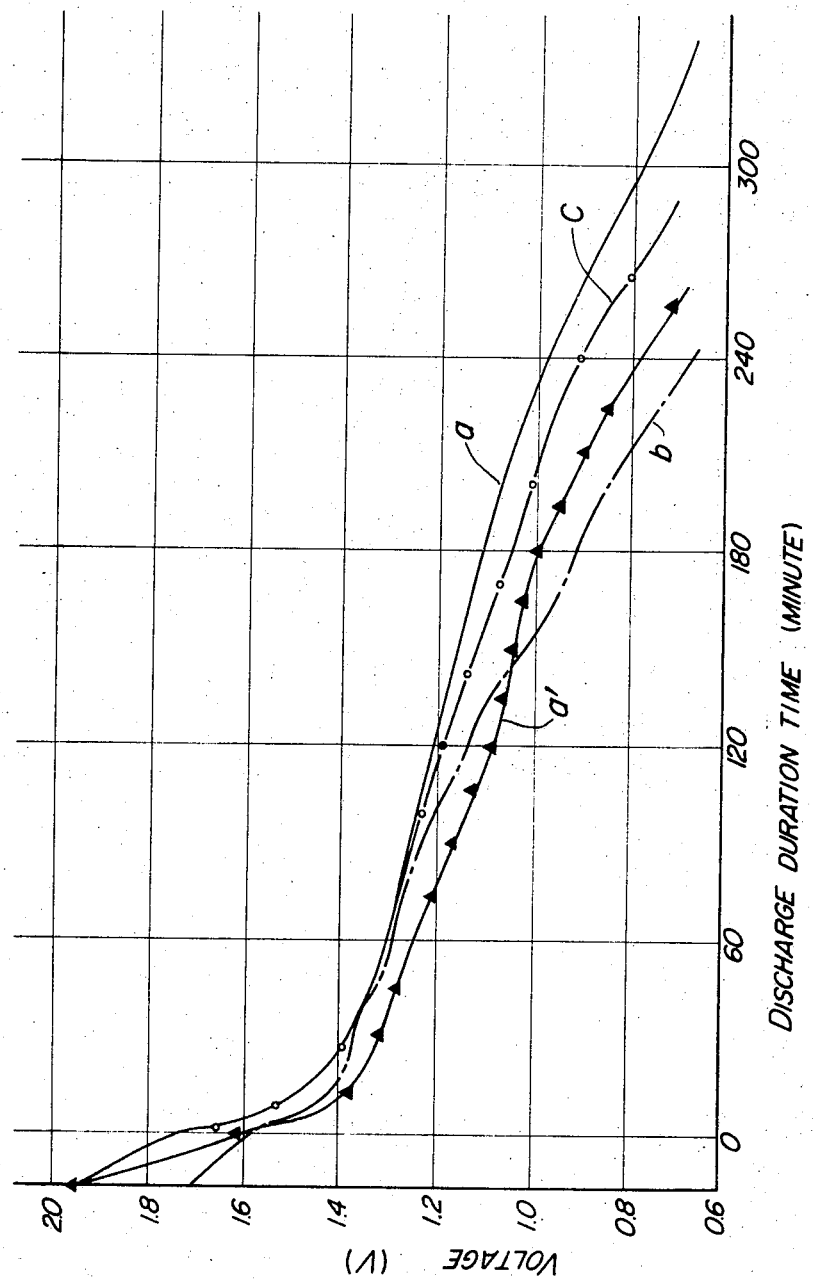

3,708,408
CELL USING MANGANESE DIOXIDE AS A CATHODE DEPOLARIZER AND A METHOD FOR PRODUCING SAID MANGANESE DIOXIDE
Atsushi Nishino, Neyagawa, Hiroshi Kumano, Daito, Yoshinori Noguchi and Kazunori Sonetaka, Kadoma, and Yasuji Amano, Hirakata, Japan, assignors to Matsushita Electric Industries Co., Ltd., Osaka, Japan
Filed Dec. 28, 1970, Ser. No. 101,714
Claims priority, application Japan, Dec. 29, 1969, 45/766, 45/767
Int. Cl. B01k *1/00;* C01b *15/00*
U.S. Cl. 204—96     2 Claims

ABSTRACT OF THE DISCLOSURE

Manganese dioxide is obtained at the cathode by electrolyzing a hydrochloric acid-acidified aqueous manganese chloride solution with a specific current efficiency. The manganese dioxide has orientation is high in oxygen content and extremely active as a depolarizer for cells.

---

Figure 1:
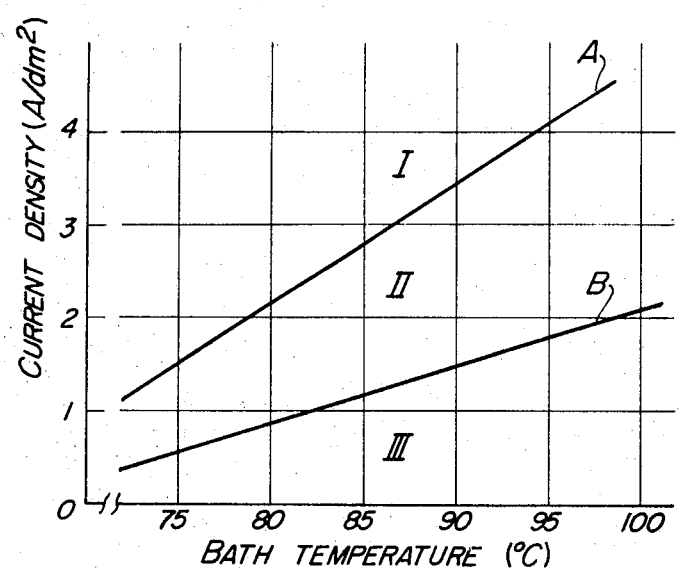

This invention relates to an improved cell which uses manganese dioxide as a cathode depolarizer and a method for producing said manganese dioxide.

Heretofore, electrolytic manganese dioxide has been produced by anodic oxidation using as electrolyte a manganese sulfate solution obtained by calcining rhodochrosite or natural ore and lixiviating and purifying the calcination product with sulfuric acid. The manganese dioxide obtained according to the said process is a powdery polycrystal of $\gamma$-$MnO_2$ and contains about 89 to 91% of effective oxygen.

Manganese dioxide, which is high in content of effective oxygen among the conventional manganese dioxides, is $\beta$-$MnO_2$. This manganese dioxide, however, is not active as a depolarizer for cells. Further, though the electrolytic manganese dioxide obtained according to the conventional process requires, at the time of production, a quantity of electricity of 2 Faradays per mole of manganese dioxide and, when used as a depolarizer for cells, 1 Faraday per mole of manganese dioxide, the discharge utilization efficiency thereof is 35 to 65% when the quantity of electricity is 1 Faraday, though said ratio varies depending on the discharge rate. This is considered ascribable to the fact that the conventional electrolytic manganese dioxide is a powdery polycrystal, so that the crystal particles thereof are high in resistance at the crystal interface. The discharge reaction of manganese dioxide is represented by the equation $$2MnO_2 + 2H^+ + 2e^- \rightarrow Mn_2O_3 \cdot H_2O$$

This equation shows that the discharge is effected by solid phase diffusion of hydrogen ions. It is therefore considered that the higher the single crystallinity of manganese dioxide crystal, the quicker becomes the reaction to make the utilization ratio higher.

Recently, the uses of dry cells have been broadened, and the development of high power cells usable for many purposes have been required. However, to increase the discharge capacity of cells by increasing the amount of depolarizing mixture is difficult since the cells are definite in volume and, in order to make the cells higher in capacity, it is necessary to develop a manganese dioxide which is higher in activity and greater in utilization efficiency.

The present inventors previously proposed a process for producing manganese dioxide having a new orientation by using a manganese chloride electrolyte.

An object of the present invention is to provide, by further improving the above-mentioned process, a process for producing manganese dioxides having a novel crystal form, which has not been observed hitherto.

Another object of the invention is to provide manganese dioxides which are high in content of effective oxygen, high in activity as depolarizers for cells, and great in discharge utilization efficiency.

Another object of the present invention is to provide a cell improved in its intermittent discharge characteristic by using as a cathode depolarizer said manganese dioxide having novel characteristics and produced by said process.

The cell which uses manganese dioxide as a cathode depolarizer includes Leclanche cells and primary and rechargeable cells which use caustic alkali as an electrolyte and zinc as an anode.

The manganese dioxides obtained according to the present invention are of the $\gamma$-form, but the physicochemical and electrochemical properties thereof are markedly different from those of $\gamma$-$MnO_2$, which is obtained according to the conventional process. For convenience, therefore, they are referred to as $\gamma_L$-$MnO_2$ and $\gamma_T$-$MnO_2$, hereinafter. Table 1 shows a comparison in principal properties between the manganese dioxides according to the present invention and the conventional $\gamma$-$MnO_2$.

TABLE I

| Crystal form | Effective oxygen (percent) | Value of $x$ of $MnO_x$ | Characteristics |
|---|---|---|---|
| $\gamma$-$MnO_2$ | 88–91.5 | 1.940–1.957 | Powdery polycrystal. |
| $\gamma_L$-$MnO_2$ | 90–94 | 1.950–1.970 | Directional, similar in structure to fibers, and high in activity. Containing some amount of chlorine. |
| $\gamma_T$-$MnO_2$ | 94–98.5 | 1.970–1.990 | Directional, and high in oxidation degree and utilization efficiency. Containing some amount of chlorine. |

The process of the present invention is explained below.
The electrolysis conditions employed in the present invention are as follows:

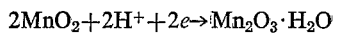

| | |
|---|---|
| Hydrochloric acid concentration | 0.01 to 1.0 mole/l ____ (I) |
| Manganese chloride concentration | 0.2 to 6.0 mole/l ____ (II) |
| Bath temperature | 70° to 99° C ____ (III) |
| Current density | 0.3 to 5 a./dm.² ____ (IV) |
| Apparent current efficiency | 60 to 102% ____ (V) |

(1)

An apparent current efficiency of 108% corresponds to the true current efficiency 100%. The apparent density is decided by taking water content and the purities of manganese salt and manganese dioxide into consideration. The electrodes used should be resistant to hydrochloric acid. The anode is required to be higher in resistance to hydrochloric acid. The cathode and anode are graphite electrodes, in general. As the anode, platinum-plated titanium may also be used, though this is expensive.

In the above, when the conditions (I) to (IV) are decided, the condition (V) is automatically decided and, when the condition (V) is decided, the conditions (I) to (IV) are decided. By the combination of such conditions, $\gamma_L$-$MnO_2$ and $\gamma_T$-$MnO_2$ are obtained.

Among the above-mentioned conditions, the hydrochloric acid concentration is limited to 0.01 to 1.0 mole/l for such reasons that to control the said concentration to less than 0.01 mole/l. is extremely difficult and is not economical from the industrial standpoint, and that the adoption of a concentration of more than 1.0 mole/l. is not desirable in view of the corrosion resistance of electrolytic apparatuses and equipments, though electrolysis is possible at said concentration.

If the manganese chloride ($MnCl_2$) concentration becomes less than 0.2 mole/l., the current efficiency is geatly lowered to narrow the permissibility of electrolysis conditions. On the other hand, the adoption of a manganese chloride concentration of more than 6.0 mole/l. is not preferable since the utilization efficiency of ores is lowered in case the preparation of manganese chloride solution has been effected according to a lixiviation method using an acid.

Even if the bath temperature is below 70° C., electrolysis can sufficiently be effected. However, the adoption of such a low bath temperature is not economical from the industrial standpoint, because the anode overvoltage becomes unnecessarily high, the current density is required to be considerably lowered, and the electro-deposition of manganese dioxide low in bulk density is brought about.

Even when the current density is less than 0.3 a./dm.$^2$, electrolysis is possible. In this case, however, the productivity per cell becomes low to bring about economical disadvantages. If the current density becomes more than 5 a./dm.$^2$, the consumption of electrodes becomes marked, the current efficiency is greatly lowered and the crystallinity of the resulting manganese dioxides becomes uneven.

The present invention is a process in which the aforesaid $\gamma_L$-$MnO_2$ and $\gamma_T$-$MnO_2$ are electrodeposited simultaneously. The electrolysis conditions adopted in the present invention are decided by the combination of the aforesaid conditions (1). Typical examples thereof are explained below with reference to the accompanying drawings.

FIG. 1 shows the relation between the current density, the bath temperature and the apparent current efficiency under the conditions that the $MnCl_2$ concentration is 1.0 mole/l. and the HCl concentration is 0.4 N. The lines A and B are isocurrent efficiency lines showing that the apparent current efficiencies under said conditions are 75% and 102%, respectively. Under the conditions in regions I, II and III which are sectioned by the lines A and B, there are obtained $\gamma_L$-$MnO_2$ or mixtures of $\gamma_L$-$MnO_2$ and $\gamma_T$-$MnO_2$. Table 2 shows the proportions of $\gamma_T$-$MnO_2$ and $\gamma_L$-$MnO_2$ which are obtained under the conditions in said regions I, II and III.

TABLE 2

| | Region | | |
|---|---|---|---|
| | I | II | III |
| $\gamma_T$-$MnO_2$ | More than 20 | 0 to 20 | 0 |
| $\gamma_L$-$MnO_2$ | Less than 80 | 80 to 100 | 100 |
| Apparent current efficiency | Less than 75 | 75 to 102 | 102 to 108 |

In FIG. 1, unevenness of the apparent current efficiency is in the range of ±5% in the case of the line A, and in the range of ±2% in the case of the line B. Factors resulting in such unevenness are differences in kind of materials of the electrodes such as graphite and the like and in surface state of the electrodes.

Figure 2:
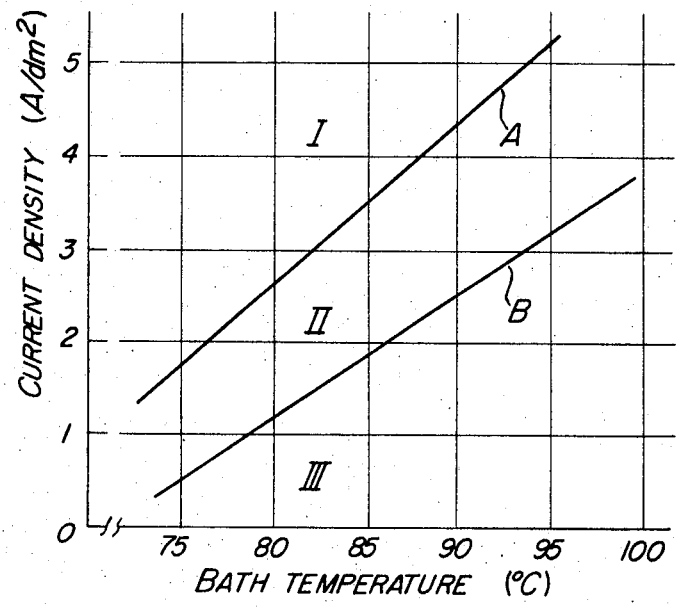

The isocurrent efficiency lines are not always such straight lines as shown in the drawing but sometimes becomes curved or broken lines depending on the conditions. For example, the lines are relatively straight when the acid concentration is in the range of 0.1 to 0.7 N but are curved when the acid concentration is more than 0.7 N, and no straight lines can be attained when the manganese concentration is less than 0.5 mole/l. Factors which give the greatest influence to the gradients of the isocurrent efficiency lines are the manganese concentration and the hydrochloric acid concentration. A general tendency is such that the increase of manganese concentration and the decrease of hydrochloric acid concentration make the gradients of isocurrent efficiency lines greater as shown in FIG. 2, whereas the decrease of manganese concentration and the increase of hydrochloric acid concentration make the gradients of isocurrent efficiency lines smaller. In the case of FIG. 2, the electrolysis conditions are such that the hydrochloric acid concentration is 0.1 N and the manganese chloride concentration is 3.0 mole/l.

Typical examples, which show the fact that the proportions of the resulting $\gamma_L$-$MnO_2$ and $\gamma_T$-$MnO_2$ vary depending on the electrolysis conditions, are as set forth in the following table:

| $MnCl_2$ (mole/l.) | HCl (N) | Bath temperature (° C.) | Current density (a./dm.$^2$) | Apparent current efficiency (percent) | $\gamma_L$-$MnO_2$/$\gamma_T$-$MnO_2$ |
|---|---|---|---|---|---|
| 1.0 | 0.4 | 95 | 0.7 | 105 | 100/0 |
| 1.0 | 0.4 | 90 | 0.5 | 104 | 100/0 |
| 1.0 | 0.4 | 80 | 1.0 | 99 | 97/3 |
| 1.0 | 0.4 | 85 | 2.0 | 84 | 86/14 |
| 1.0 | 0.4 | 95 | 2.5 | 90 | 92/8 |
| 1.0 | 0.4 | 85 | 3.0 | 70 | 75/25 |
| 1.0 | 0.4 | 90 | 4.0 | 67 | 70/30 |
| 1.0 | 0.1 | 95 | 1.0 | 108 | 100/0 |
| 1.0 | 0.8 | 95 | 1.0 | 95 | 96/4 |
| 1.0 | 0.3 | 90 | 2.0 | 91 | 93/7 |
| 3.0 | 0.3 | 90 | 2.0 | 105 | 100/0 |
| 0.3 | 0.3 | 90 | 2.0 | 73 | 76/24 |
| 3.0 | 0.1 | 95 | 4.0 | 85 | 88/12 |
| 3.0 | 0.1 | 95 | 3.0 | 104 | 100/0 |

In the next place, the properties of the manganese dioxides obtained under the conditions employed in the present invention are mentioned below.

Figure 4:
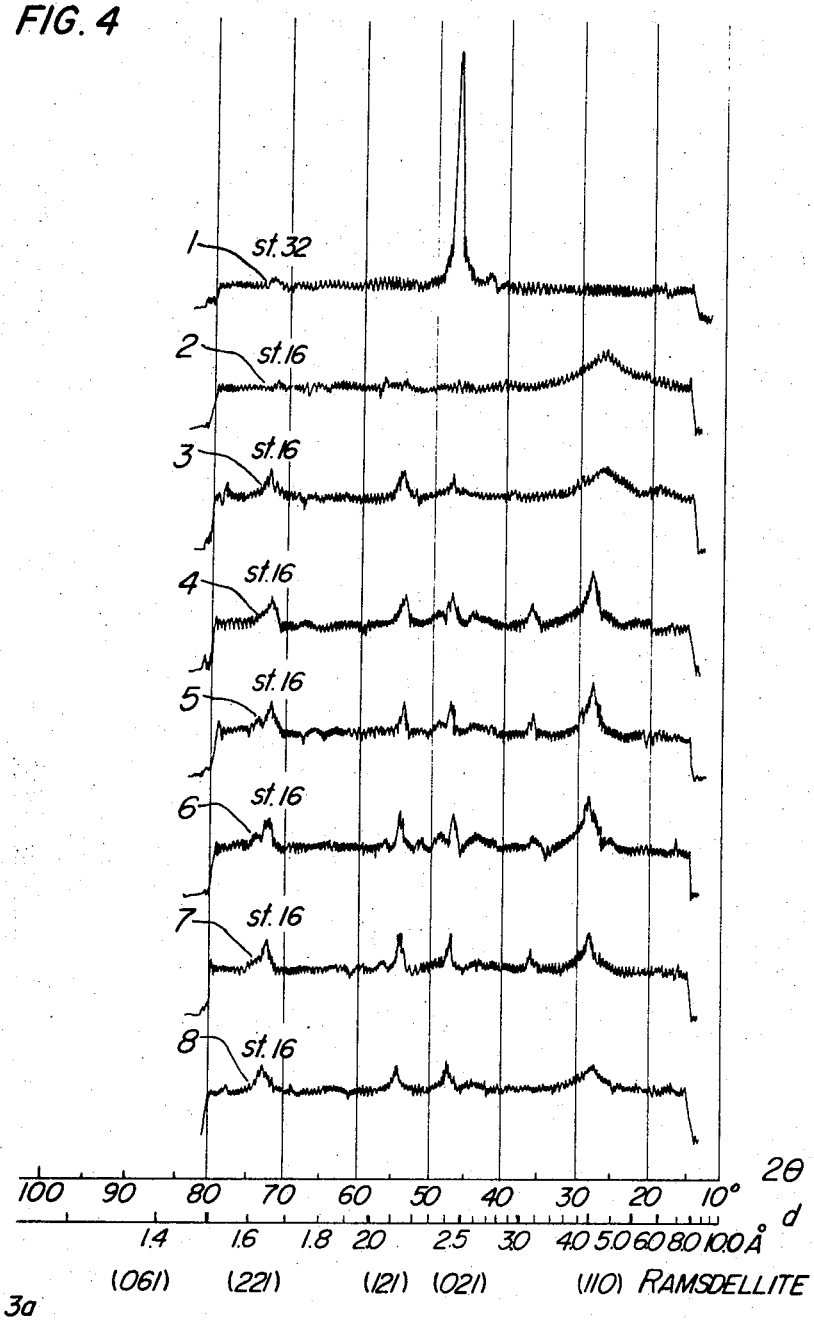
Figure 3A:
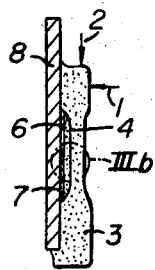
Figure 3B:
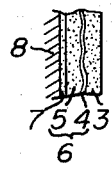

FIG. 3a is a cross-section of manganese dioxide electrodeposited under the conditions in the aforesaid region II. FIG. 3b shows an enlarged cross-section of IIIb part in FIG. 3a. This manganese dioxide can be easily divided into 2 layers at the portion 4. FIG. 4 shows X-ray diffraction patterns of this manganese dioxide, wherein the curve (1) is the diffraction pattern in the case where X-rays were applied from the direction 1 in FIG. 3a, i.e. from the direction vertical to a flat graphite electrode 8; the curve (2) is the diffraction pattern in the case where X-rays were applied from the direction 2 in FIG. 3a; the curve (3) is the diffraction pattern in the case where X-rays were applied to the manganese dioxide at the portion 3 in FIG. 3 which had been ground to −325 mesh; and the curves (4), (5), (6) and (7) are diffraction patterns in the cases where X-rays were applied to portions 4, 5, 6 and 7 in FIGS. 3a and 3b which had been ground to −325 mesh. 6 in FIG. 3b means a mixture of portions 5 and 4.

The manganese dioxide showing the curves (1), (2) and (3) is $\gamma_L$-$MnO_2$, and the manganese dioxide showing the curves (4), (5), (6) and (7) is $\gamma_T$-$MnO_2$.

The curve (8) in FIG. 4 is the diffraction pattern of the conventional electrolytic $\gamma$-$MnO_2$ produced from manganese sulfate solution which had been ground to −325 mesh.

In the $\gamma_T$-$MnO_2$ of the curves (4), (5), (6) and (7), there is observed 1 to 4% of $\beta$-$MnO_2$, but most of the said manganese dioxide is $\gamma_T$-$MnO_2$ of high oxidation degree. In the conventional $\gamma$-$MnO_2$, the X-ray diffraction pattern of index of plane (110) of ramsdellite is low in intensity and broad, whereas in the $\gamma_T$-$MnO_2$, the said diffraction pattern is high in intensity and extremely sharp. $\gamma$-$MnO_2$ of high oxidation degree which shows such X-ray diffraction pattern has been entirely unknown hitherto.

The $\gamma_L$-$MnO_2$, which has such new properties, electrodeposits with an apparent current efficiency of 102 to 108% by combining the aforesaid electrolysis conditions, and the $\gamma_T$-$MnO_2$ electrodeposits in the $\gamma_L$-$MnO_2$ when the apparent current efficiency is less than 102%. The electrolytic deposition mechanism of the $\gamma_T$-$MnO_2$ is not clear at present. However, when a $MnCl_2$ solution is electrolyzed, the anode overvoltage tends to increase under the conditions where the apparent current efficiency is less than 108%, and chlorine begins to generate at the anode when the apparent current efficiency becomes less than 102%. From this, it is considered that by the said chlorine at the generation stage at the anode or by chlorine gas or chlorine water, $\gamma_L$-$MnO_2$ which has once been electrodeposited is increased in oxidation degree without being injured in crystal form, with the result that such high oxidation degree manganese dioxide as $\gamma_T$-$MnO_2$ is obtained. Although it is considered that such oxidation reaction accompanies side reactions of forming minute amounts of lower oxides, MnO, $Mn_2O_3$ and $Mn_3O_4$ cannot be identified from the X-ray diffraction patterns. In the $\gamma_T$-$MnO_2$, however, there are observed unidentifiable X-ray diffraction lines (e.g. 44°, 49°, 56°, 74°, etc.).

Figure 6:
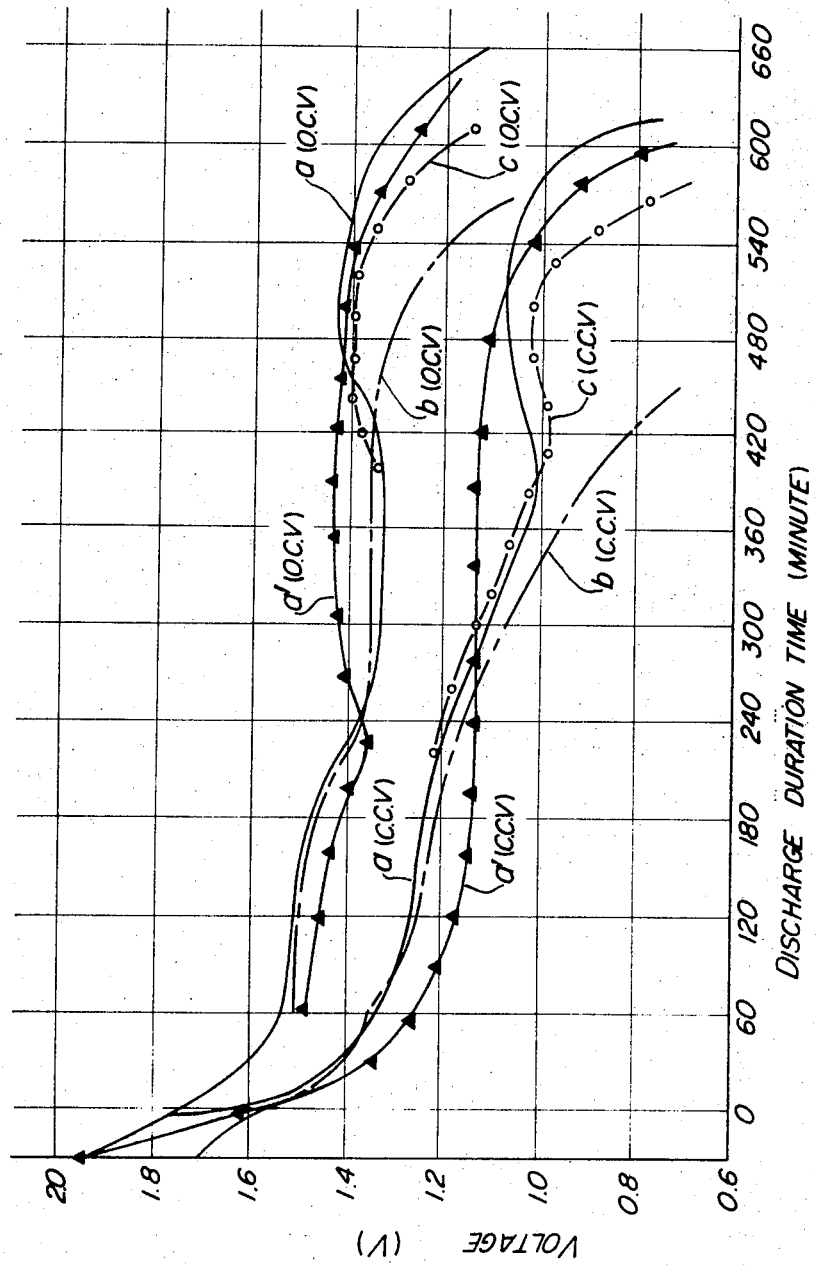
Figure 7:
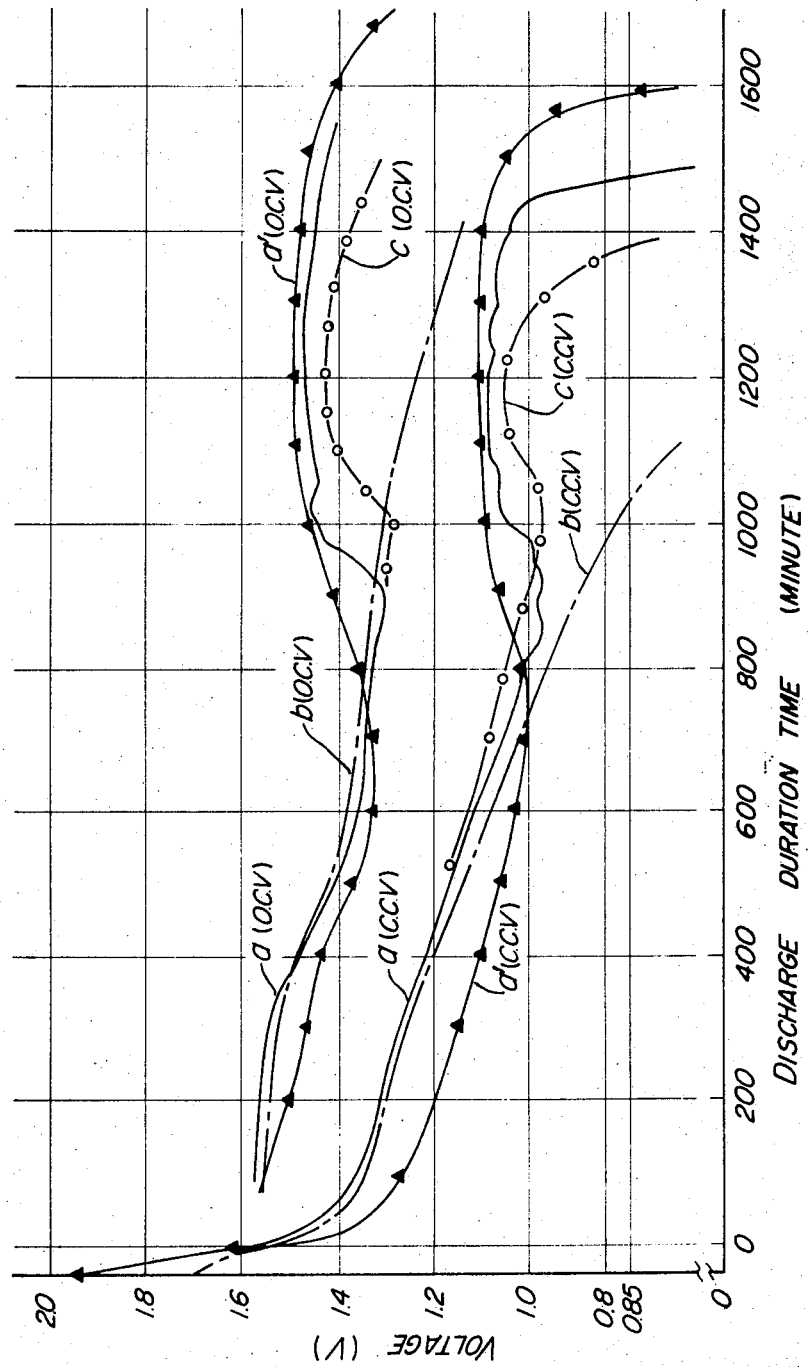

Using as a depolarizer each of a manganese dioxide mixture comprising $\gamma_L$-$MnO_2$ and $\gamma_T$-$MnO_2$ which has been obtained under the conditions in the aforesaid region II, and $\gamma$-$MnO_2$ obtained according to a conventional process, UM-1 and UM-3 type (JIS) dry cells were prepared. These cells were compared to each other in discharge characteristics to obtain the results as shown in FIGS. 5 to 7. In the drawings, the curve (a) represents the dry cell containing the mixture of $\gamma_T$-$MnO_2$ and $\gamma_L$-$MnO_2$, the curve (a') represents the dry cell containing the $\gamma_T$-$MnO_2$, and the curve (b) represents the dry cell containing the conventional $\gamma$-$MnO_2$, the curve (c) represents the dry cell containing the $\gamma_L$-$MnO_2$.

FIG. 5 shows the 10Ω continuous discharge curves of the UM-3 type dry cells 20° C. As is clear from FIG. 5, the cell (a) according to the present invention is high in service voltage on the whole and excellent in efficiency.

FIG. 6 shows the 4Ω intermittent (30 min./day, 6 days/week) discharge curves of the UM-3 type dry cells at 20° C., and FIG. 7 shows the intermittent discharge curves of the UM-1 type dry cells under the said conditions. As is clear from FIGS. 6 and 7, in the case of the cells (a) according to the present invention in which is used manganese dioxide, both the closed circuit voltage (C.C.V.) and the open circuit voltage (O.C.V.) recover the potentials when the closed circuit voltage becomes close to about 1.0 v. to show characteristic discharge curves which have not been observed hitherto.

The reason why the cells of the present invention show such excellent discharge characteristics at the time of intermittent discharge has not been clarified yet, but is considered to be as follows:

When the closed circuit voltage is up to about 1.1 v., $MnO_2$ composed of $\gamma_L$-$MnO_2$ and $\gamma_T$-$MnO_2$ discharges according to a homogeneous reaction represented by the Equation 2, like in the case of the conventional $\gamma$-$MnO_2$, but when the closed circuit voltage becomes near to about 1.1 v., the $MnO_2$ brings about such a heterogeneous reaction as represented by the Equation 3, so that both the open circuit and closed circuit voltages are recovered to greatly prolong the discharge duration time up to 0.85 v.

$$2MnO_2 + 2H^+ + 2e \rightarrow Mn_2O_3 \cdot H_2O \quad (2)$$

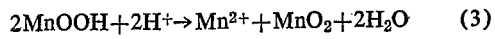

$$2MnOOH + 2H^+ \rightarrow Mn^{2+} + MnO_2 + 2H_2O \quad (3)$$

The reaction of the Equation 3 can be substantiated by the fact that as the result of analysis, the amount of $Mn^{2+}$ contained in the depolarizing mixture of the cell after completion of discharge was 4 to 10 times more than in the case of a conventional product, though the value somewhat varies depending on the discharge rate.

When only $\gamma_L$-$MnO_2$ is used as the depolarizer, both the utilization ratio and the duration time decrease by about 5 to 10% as shown by curves (c) in FIGS. 5 to 7, and the recovery phenomenon of potential at the time of intermittent discharge is not so marked.

As mentioned above, the cell of the present invention which contains $\gamma_T$-$MnO_2$ as a depolarizer has a high capacity and is excellent in especially intermittent discharge characteristic. This $\gamma_T$-$MnO_2$, as mentioned before, is characterized in that it has apparently an orientation, is somewhat softer than $\gamma_L$-$MnO_2$, has deep black color, has a peak indicating an index of plane (110) of ramsdellite in the X-ray diffraction pattern at 28° with a sharp intensity, has dull diffraction lines at 44°, 49°, 56°, and 74° of $2\theta$, contains 94-98.5% of effective oxygen and $x$ in $MnO_x$ is 1.970-1.990.

Said manganese dioxide can be produced by carrying out an electrolysis under such conditions as hydrochloric acid concentration of 0.01-1.0 mole/l., manganese chloride concentration of 0.2-6.0 mole./l., bath temperature of 70°-99° C., current density of 0.3-5 a./dm.², so that apparent current efficiency becomes less than 102%, preferably 60 to 102%, i.e. under the conditions in the aforesaid regions I and II, preferably in the region II.

What is claimed is:
1. A process for electrolytic deposition of manganese dioxide, comprising: electrolyzing an aqueous solution of manganese chloride which comprises a hydrochloric acid concentration of 0.01 to 1.0 mole/l. and a manganese chloride concentration of 0.2 to 6.0 mole/l., at a bath temperature of 70° to 99° and a current density of 0.3 to 5 a./dm.² so that the apparent current efficiency becomes less than 102%, thereby depositing manganese dioxide onto the anode.

2. A process according to claim 1, wherein the apparent current efficiency becomes 60 to 102%.

References Cited
UNITED STATES PATENTS 3,018,234   1/1962   Litt _____ 204—96 X
3,535,217   10/1970  Amano et al. _____ 204—96

JOHN H. MACK, Primary Examiner
D. R. VALENTINE, Assistant Examiner

U.S. Cl. X.R.
204—83

UNITED STATES PATENT OFFICE
CERTIFICATE OF CORRECTION

Patent No. 3,708,408  Dated January 2, 1973

Inventor(s) ATSUSHI NISHINO et al.

It is certified that error appears in the above-identified patent and that said Letters Patent are hereby corrected as shown below:

Please change the reference to the assignee of the patent as follows:

Change "Matsushita Electric Industries Co., Ltd." to --Matsushita Electric Industrial Co., Ltd.--

Signed and sealed this 3rd day of July 1973.

(SEAL)
Attest:

EDWARD M. FLETCHER, JR.
Attesting Officer

Rene Tegtmeyer
Acting Commissioner of Patents